(12) United States Patent
Kagawa

(10) Patent No.: US 7,877,010 B2
(45) Date of Patent: Jan. 25, 2011

(54) DEVICE FOR MONITORING THE QUALITY OF AN OPTICAL SIGNAL BY FILTERING ITS BEAT COMPONENT

(75) Inventor: Masatoshi Kagawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 643 days.

(21) Appl. No.: 11/902,577

(22) Filed: Sep. 24, 2007

(65) Prior Publication Data

US 2008/0080856 A1 Apr. 3, 2008

(30) Foreign Application Priority Data

Sep. 28, 2006 (JP) .............................. 2006-265247

(51) Int. Cl.
 *H04B 10/08* (2006.01)
 *H04B 10/06* (2006.01)
(52) U.S. Cl. .............................. 398/29; 398/25; 398/28; 398/38; 398/207
(58) Field of Classification Search .................. 398/25, 398/26, 27, 28, 29, 38, 203, 204, 207
 See application file for complete search history.

(56) References Cited

U.S. PATENT DOCUMENTS

| 4,759,080 A * | 7/1988 | Emura et al. ................. 398/192 |
| 6,335,814 B1 * | 1/2002 | Fuse et al. .................... 398/201 |
| 2004/0156632 A1 * | 8/2004 | Lee et al. ....................... 398/26 |

FOREIGN PATENT DOCUMENTS

JP  2005-151597  6/2005

* cited by examiner

Primary Examiner—Kenneth N Vanderpuye
Assistant Examiner—Daniel G Dobson
(74) Attorney, Agent, or Firm—Rabin & Berdo, P.C.

(57) ABSTRACT

An optical signal quality monitor device includes a local oscillator that generates a local oscillation signal, with which a mixer mixes an input optical signal to output a mixed signal, of which at least one beat component a filter that extracts. An intensity detector detects intensity of the extracted beat component. The monitor device may thus accurately and rapidly monitor the quality of an input optical signal transmitted even at a higher bit rate.

3 Claims, 6 Drawing Sheets

|  | SMF | HNLF |
|---|---|---|
| LOSS (dB/km) | 0.2 | 1 |
| Aeff ($\mu m^2$) | 80 | 6.5 |
| NON-LINEARITY ($W^{-1}km^{-1}$) | 1.3 | 25 |
| DISTRIBUTION (ps/nm/km) | 16 | 0 |

DEVICE FOR MONITORING THE QUALITY OF AN OPTICAL SIGNAL BY FILTERING ITS BEAT COMPONENT

BACKGROUND OF THE INVENTION

1. Field of the Invention

The present invention relates to an optical signal quality monitor device, and particular to a monitor device applicable, for example, to an optical transmission system.

2. Description of the Background Art

In an optical transmission system, the quality of a transmitted optical signal is monitored to reflect results from the monitoring on an optical signal receiver or the like.

The signal quality is monitored, for example, by a parity check between repeaters, thus locating the failure section or producing a signal for switching to an alternative section. The parity check detects errors after demodulated from the optical signal. Therefore, when the transmission section varies its quality very rapidly, the parity check result may not correctly reflect the quality of the subject section.

The quality of the optical signal may therefore preferably be monitored substantially on a real time basis. Japanese patent laid-open publication No. 2005-151597 proposes an optical signal quality monitor that satisfies such a request. The '597 Japanese publication discloses an optical signal quality monitor including a photoelectric converter, a timing clock generator, and an electrical signal processor. The photo electric converter converts an optical signal having its bit rate equal to a positive integer (N) multiple of the basic clock frequency to a corresponding electrical signal. The timing clock generator generates a timing clock signal having its repetition frequency slightly different from a positive integer (n) submultiple of the basic clock frequency. The electrical signal processor samples the level of the electrical signal at the timing clock signal for a predetermined period of time to produce a histogram, and analyze the distribution on the histogram to determine the signal to noise ratio (S/N ratio) to check the quality of the optical signal. The '597 publication thus discloses a technology that performs asynchronous sampling to obtain a waveform in a short period of time, thus monitoring by a relatively simple configuration the Q value, which is a parameter equivalent to the signal to noise ratio.

In the technology of the '597 publication, however, the higher bit rate of a transmitted optical signal, the fewer sampling points, thus making it more difficult to perform the quality monitoring.

SUMMARY OF THE INVENTION

It is therefore an object of the present invention to provide an optical signal quality monitor device that may accurately and rapidly monitor the quality of an optical signal transmitted even at a higher bit rate.

In accordance with the present invention, an optical signal quality monitor device comprises: a local oscillator that generates a local oscillation signal; a mixer that mixes an input optical signal with the local oscillation signal; a filter that extracts at least one beat component of a signal output from the mixer; and an intensity detector that detects the intensity of the extracted beat component.

The optical signal quality monitor device in accordance with the present invention may accurately and rapidly monitor the quality of an optical signal transmitted even at a higher bit rate.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

An optical signal quality monitor device according to a first, illustrative embodiment of the present invention will be described below in detail with reference to the accompanying drawings.

Figure 1:
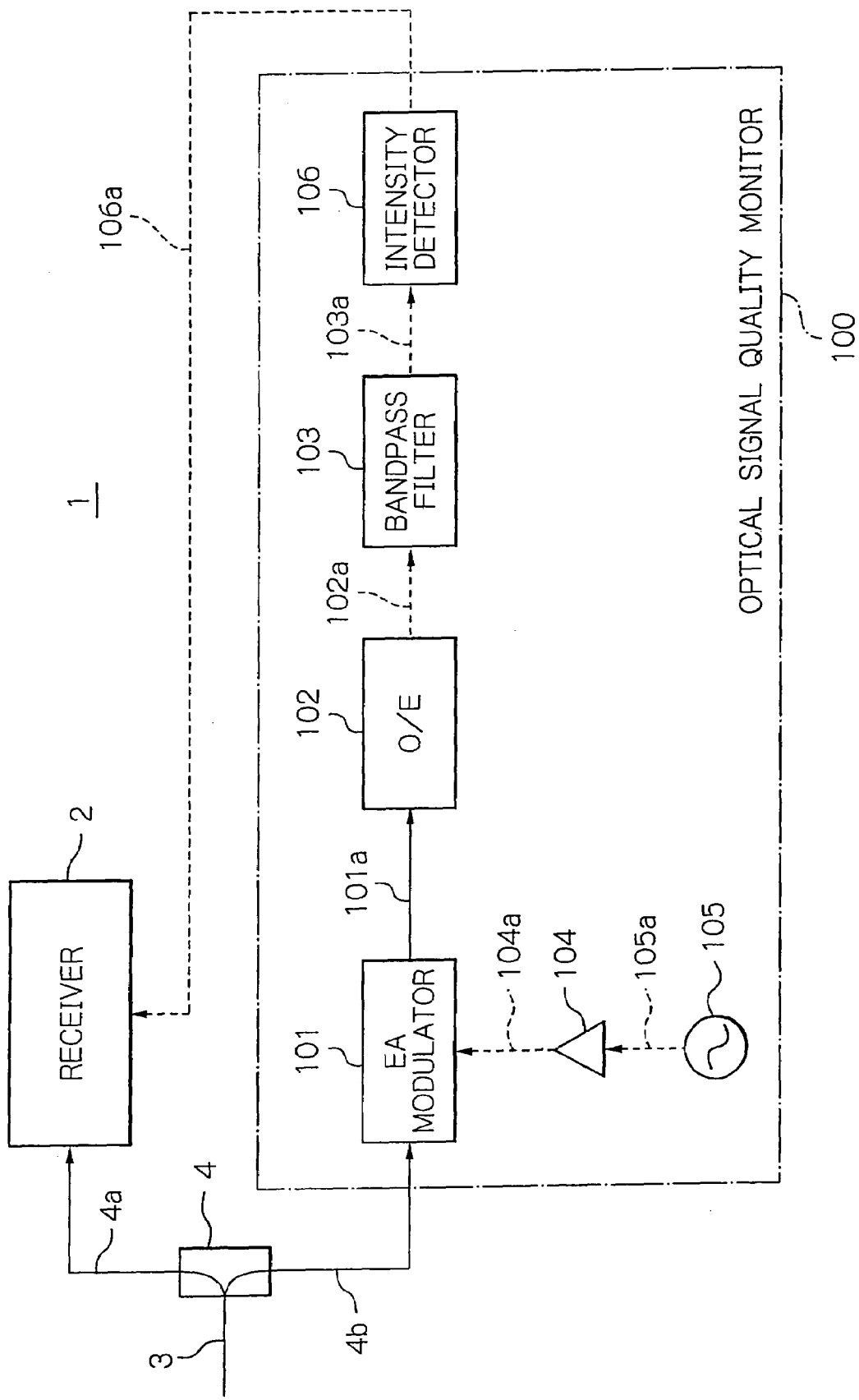
FIG. 1 is a schematic block diagram of the configuration of an optical signal quality monitor device according to a first embodiment of the present invention.

FIG. 1 is a schematic block diagram showing the configuration of an optical signal quality monitor device: 100 according to the first embodiment. The optical signal quality monitor device 100 is adapted to form an optical receiver device 1 together with a receiver 2 that performs a receiving process per se.

An optical signal transmitted over an optical transmission line 3 to the optical receiver device 1 is split by an optical coupler 4 into two signals, of which one is input to the receiver 2 and the other is input to the optical signal quality monitor device 100 over signal lines 4a and 4b, respectively. Signals are designated with reference numerals of connections on which they are conveyed.

The optical signal quality monitor device 100 includes an electro-absorption (EA) modulator 101, an optical-to-electrical (O/E) converter 102, a bandpass filter 103, an amplifier 104, a local oscillator 105, and an intensity detector 106, which are interconnected as illustrated. The EA modulator 101 and O/E converter 102 are involved in the system of optical signal stream, depicted with solid lines in FIG. 1. The remaining components are involved in the system of electric signal stream, depicted with dotted lines in the figure.

The local oscillator 105 is adapted to generate a sinusoidal wave of local oscillation signal in the form of electrical signal having its frequency depending on the bit rate of the input optical signal 3, and output the generated signal over a signal line 105a. The amplifier 104 is adapted to amplify the local oscillation signal 105a to drive the EA modulator 101 and provide the signal over a signal line 104a to a control terminal of the EA modulator 101.

When the optical signal 3 input to the optical signal quality monitor device 100 is an RZ (Return to Zero) signal of a bit rate of N [bit/s], for example, the local oscillator 105 generates a local oscillation signal 105a having a frequency of N/n−Δf [Hz], where n is an arbitrary integer and N is equal to, for example, a value of 39.8312 [Gbit/s] or the like prescribed by Recommendations OC-768/STM-256 of the International Telecommunication Union Telecommunication Standardization Sector (ITU-T).

The EA modulator 101 receives an optical signal and an electrical signal on its inputs 4b and 104a, respectively, to mix the transmitted optical signal 4b with the local oscillation signal 104a. In other words, the EA modulator 101 is adapted to downconvert the frequency of the transmitted optical signal 4b depending on the local oscillation signal 104a. When the input signal 3 received by the optical signal quality monitor device 100 is the RZ optical signal of N [bit/s] and the local oscillation signal has its frequency of N/n−Δf [Hz], the EA modulator 101 outputs an optical signal having its primary, or fundamental, component equal to n×Δf [Hz].

The O/E converter 102 converts an optical signal output from the EA modulator 101 over a signal line 101a to a corresponding electrical signal, and outputs the electrical signal over a signal line 102a.

The bandpass filter 103 filters, or extracts, from the converted electrical signal 102a, the frequency component of the primary component of the optical signal that is output from the EA modulator 101, and outputs the extracted frequency component over a signal line 103a.

The intensity detector 106 detects the intensity, e.g. amplitude or electric power, of the signal 103a output from the bandpass filter 103 to provide the receiver 3 over a signal line 106a with a resultant signal which is representative of the quality, e.g. signal to noise ratio, of the optical signal 3 input to the optical signal quality monitor device 100.

The output signal 103a from the bandpass filter 103 is an electrical signal, which the term "intensity" is generally not familiar with. However, since what is intended herein is the "intensity" or "strength" at the stage where the signal of interest is in the form of light, the term "intensity" or "strength" may thus be used although applied to the stage in which the signal of interest has been converted to the form of electrical signal.

In operation, the optical signal quality monitor device 100 receives part (4b) of the optical signal 3 in the form of RZ optical signal of N [bit/s], for example, after split by the coupler 4. The optical signal 4b is in turn mixed by the EA modulator 101 with the local oscillation signal 104a having its frequency of N/n−Δf [Hz], the local oscillation signal 104a being output from the local oscillator 105 and amplified by the amplifier 104.

The EA modulator 101 in turn outputs the resultant optical signal 101a having its primary component equal to n×Δf [Hz]. The optical signal 101a output from the EA modulator 101 is converted by the O/E converter 102 to a corresponding electrical signal 102a. The electrical signal 102a is then filtered by the bandpass filter 103 to thereby cause the frequency component of n×Δf [Hz] to be extracted. The intensity of the extracted frequency component of n×Δf [Hz] is detected by the intensity detector 106 to output a resultant signal 106a representing the quality, e.g. signal to noise ratio, of the input optical signal 3.

Figure 2:
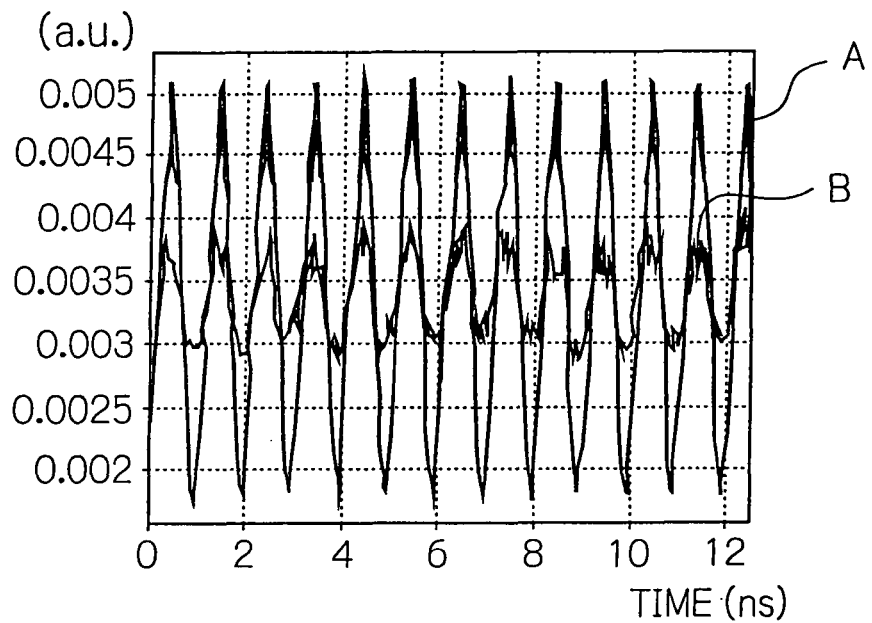
FIG. 2 illustrates the difference in waveform of signals output from a bandpass filter when input optical signals have different qualities in the first embodiment.

Well, FIG. 2 shows an exemplified waveform of the frequency component of n×Δf [Hz] of the signal 103a which is output from the bandpass filter 103 in response to the input optical signal 3, when having its bit rate of 160 [Gbit/s], the exemplified frequency component being of 1 [GHz] for n of 4 and Δf of 250 [kHz]. The signal waveform shown in FIG. 2 is resultant from a simulation.

In FIG. 2, the larger amplitude waveform A represents the output from the bandpass filter 103 for the input optical signal 3, when having its optical signal to noise ratio (OSNR) equal to 23 dB. The smaller amplitude waveform B represents the output from the bandpass filter 103 for the input optical signal 3, when having its OSNR equal to 10 dB. As seen from FIG. 2, as the input optical signal degrades itself in quality (OSNR), the bandpass filter 103 decreases its output intensity.

Figure 3:
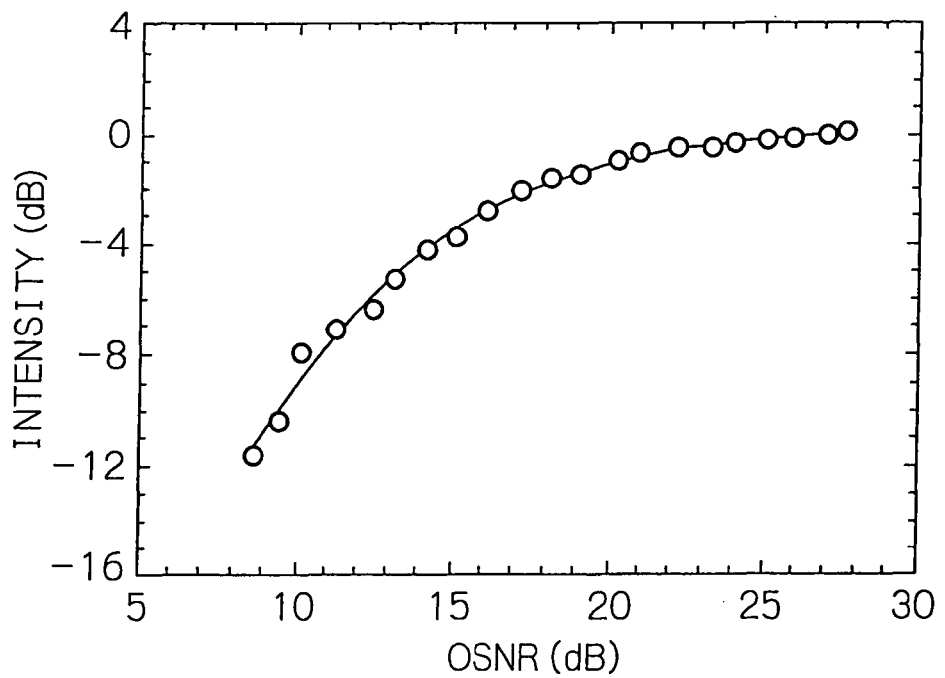
FIG. 3 plots the relationship between the input optical signal quality and the intensity of the signal output from the bandpass filter in the first embodiment.

In FIG. 3, the x-axis represents the OSNR of the input optical signal 3, and the y-axis represents the detected intensity 106a of the intensity detector 106.

As can be seen from FIGS. 2 and 3, as the OSNR degrades, the intensity decreases. Also seen from FIG. 3, for the OSNR below 20 dB, the ratio of the intensity change to the OSNR change increases, the curve having its slope steeper in FIG. 3. This means that the intensity may be monitored to detect the OSNR value itself. The intensity detector 106 may be adapted to output the intensity as an OSNR value, or alternatively to output a result from comparison with a threshold.

In the system configuration in which the bandpass filter 103 may filter a beat, or harmonic, component from the signal 102a resultant from the mixing by the EA modulator 101, when the input optical signal 3 is good in quality, the beat component caused by the mixing will not be spread widely so that if passes through the bandpass filter 103 without substantially being filtered out, whereas, when the input optical signal 3 is poor in quality, the mixing will cause the beat component to be spread widely so that the beat component is partially filtered out through the bandpass filter 103. Thus, the intensity, i.e. electric power, of the signal 103a output from the bandpass filter 103 is dependent upon the signal quality of the input optical signal 3, the result as shown in FIGS. 2 and 3 being obtained.

According to the illustrative embodiment, the simple configuration as shown in FIG. 1 may detect the quality, i.e. OSNR, of the input optical signal, and also evaluate the quality in the form of numerical value when the quality is lower than a certain threshold, e.g. 20 dB.

According to the illustrative embodiment, the quality of the input optical signal 3 may be evaluated without using a statistical process, thereby allowing the detection results to reflect the quality variation almost in real time.

Also according to the illustrative embodiment, the EA modulator 101 mixes the received optical signal 4b, the bandpass filter 103 extracts the beat component, and the intensity of the component thus extracted is detected by the intensity detector 106, as described above. Therefore, even when the transmitted optical signal 3 is high in bit rate, the signal 103a to be detected by the intensity detector 106 is low in frequency to the extent of the frequency equal to 1/160 of the frequency of the input optical signal 3, in the above example. The signal quality may thus be detected accurately. The component that operates at high frequency is the EA modulator 101 only. From this point also, the monitor device 100 is advantageously applicable to the optical signal 3, when transmitted at a higher bit rate.

Because it is only necessary that the value of n×Δf [Hz] falls within the band of the bandpass filter 103, the difference frequency Δf [Hz] may be relatively flexibly set. The local oscillator 105 thus does not need to be synchronized with the input optical signal 3, which may also facilitate the configuration to be simplified.

The optical signal quality monitor device according to an alternative, second embodiment of the present invention will be described below in detail with reference to FIG. 4, which is a schematic block diagram of the configuration of an optical signal quality monitor device 100A. In the following, like components will be designated with the same reference numerals.

The optical signal quality monitor device 100A according to the second embodiment is adapted to selectively receive on its input 4b either one of plural (three in FIG. 4) bit rates of input optical signals. The monitor device 100A is designed to be compatible with any of the bit rates of input optical signals 4b.

Figure 4:
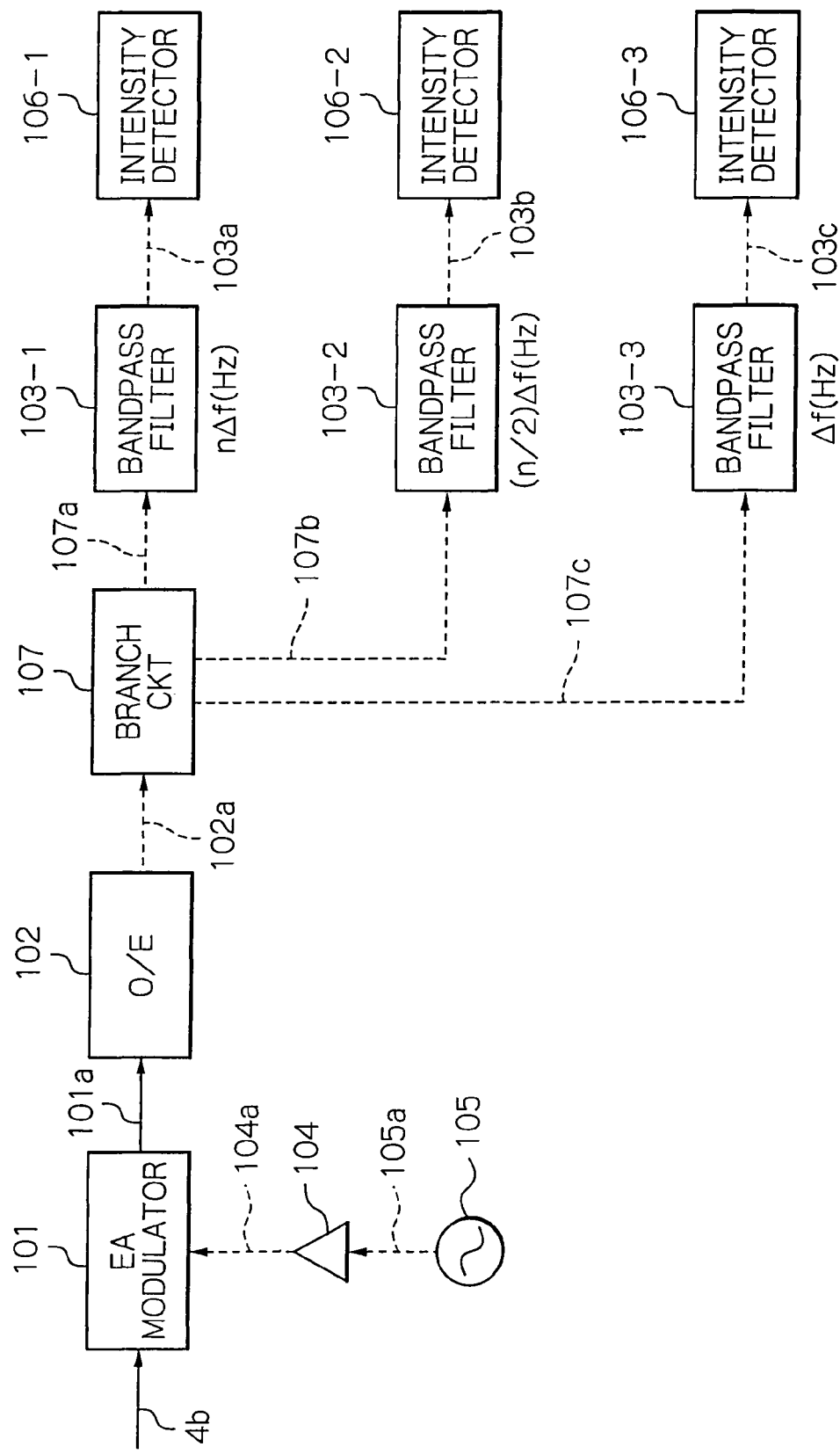
FIGS. 4 and 5 are a schematic block diagram of the configuration of an optical signal quality monitor device according to a second and a third embodiment of the invention, respectively.

In FIG. 4, the optical signal quality monitor device 100A includes a set of EA modulator 101, O/E converter 102, amplifier 104 and local oscillator 105, which are interconnected as shown. The monitor device 100A also includes a corresponding plurality (three in this example) of bandpass filters 103-1, 103-2 and 103-3, and a corresponding plurality (also three) of intensity detectors 106-1, 106-2 and 106-3, the plurality corresponding to the bit rates that the device 100A may support. The device 100A further includes a branch circuit 107 that is not provided in the first embodiment.

The EA modulator 101, the O/E converter 102, the amplifier 104, and the local oscillator 105 may be the same as in the first embodiment. Except for the bit rate, the bandpass filters 103-1, 103-2 and 103-3 and the intensity detectors 106-1, 106-2 and 106-3 may also be the same in structure as in the first embodiment.

The branch circuit 107 is adapted to divide the signal output 102a provided from the O/E converter 102 into three components, which are provided over signal lines 107a, 107b, and 107c to the bandpass filters 103-1, 103-2 and 103-3, respectively.

Note that the branch circuit 107 may be replaced by a switch circuit that is adapted to selectively connect the output terminals 107a, 107b and 107c depending on the bit rate of the input optical signal 4b, and in this case, the intensity detectors 106-1, 106-2 and 106-3 may be replaced by a sole intensity detector like 106, FIG. 1. Even when the branch circuit 107 is applied, the bandpass filters 103-1, 103-2 and 103-3 may be followed by another switch circuit adapted for selecting the outputs of the filters 103a, 103b and 103c depending on the bit rate of the input optical signal 4b, and the intensity detectors 106-1, 106-2 and 106-3 may be replaced by a single intensity detector 106.

Assume, for example, that three types of input optical signals are RZ optical signals respectively having a bit rate of N [bit/s], N/(n/2) [bit/s], and N/n [bit/s]. The value N [bit/s] is equal to, for example, 159.25248 [Gbit/s]. For those possible, three types of input optical signals, the local oscillator 105 oscillates the local oscillation signal 105a having a frequency of N/n−Δf [Hz].

When the input optical signal 3 is the RZ optical signal having a bit rate of N [bit/s], the EA modulator 101 will cause by mixing a signal having a frequency of n×Δf [Hz] to be output as the primary component 101a. The signal 101a is then photoelectrically converted by the O/E converter 102, and then divided by the branch circuit 107 into three signals 107a, 107b and 107c, which are in turn provided to the bandpass filters 103-1, 103-2 and 103-3, respectively.

The bandpass filter 103-1 is adapted to filter the frequency component of n×Δf [Hz], the bandpass filter 103-2 is to filter the frequency component of (n/2)×Δf [Hz], and the bandpass filter 103-3 is to filter the frequency component of Δf [Hz], with the instant alternative embodiment. It then follows that only the bandpass filter 103-1 allows the signal having the frequency of n×Δf [Hz] to pass as the primary component, and the bandpass filters 103-2 and 103-3 do not allow the signal having the frequency of n×Δf [Hz] to pass as the primary component.

Only the intensity detector 106-1 is thus responsive to the filtered signal 103a to output the effective detection signal 106a to the receiver 2, FIG. 1, and the intensity detectors 106-2 and 106-3 will output ineffective detection signals.

The receiver 2, FIG. 1, which receives the detection signals 106a from the intensity detectors 106-1, 106-2 and 106-3 in this manner, keeps track of the bit rate of the optical signal 3 that is presently transmitted and received, so that the receiver 2 handles only the detection signal 106a coming from the intensity detector 106-1 as an effective intensity signal.

When the input optical signal is the RZ optical signal having the bit rate of N/(n/2) [bit/s], almost the same operation as above is performed, so that only the intensity detector 106-2 outputs the effective detection signal 106a. When the input optical signal 3 is the RZ optical signal having the bit rate of N/n [bit/s] also, almost the same operation as above is performed, so that only the intensity detector 106-3 outputs the effective detection signal 106a.

The alternative embodiment may have a similar advantage to the first embodiment and also have an advantage that it may adapt to a plurality of bit rates of input optical signals.

The optical signal quality monitor device according to another alternative, third embodiment of the present invention will be described below in detail with reference to FIG. 5, which is a schematic block diagram of the configuration of an optical signal quality monitor device 100B. The optical signal quality monitor device 100B may be the same as the first embodiment 100 except that the quality detection uses a plurality (two in FIG. 5) of beat components.

Figure 5:
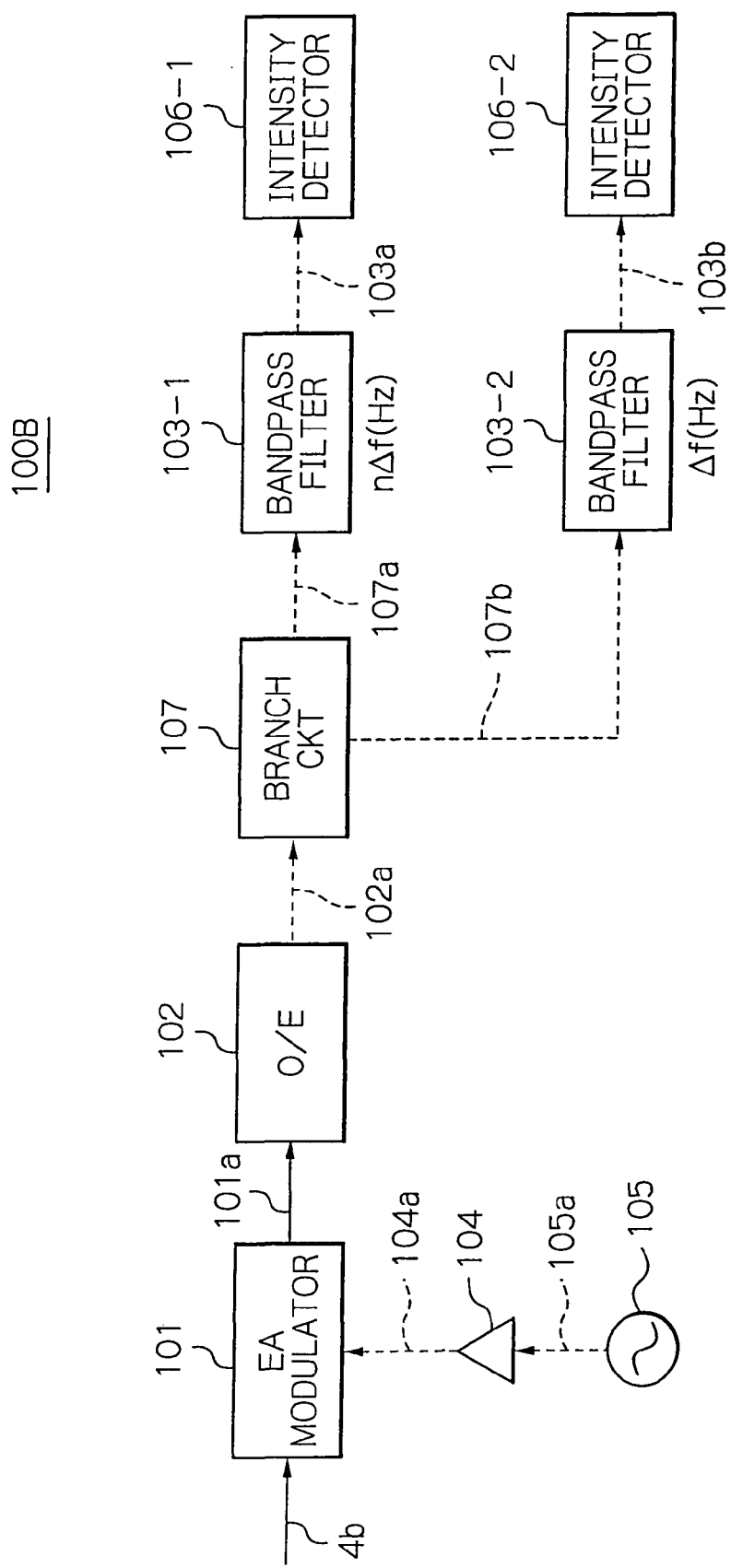

In FIG. 5, the optical signal quality monitor device 100B includes a single set of EA modulator 101, O/E converter 102, amplifier 104 and local oscillator 105, which are interconnected as depicted. The monitor device 100B also includes the bandpass filters 103-1 and 103-2 corresponding in number to the types of beat components that are used, and the intensity detectors 106-1 and 106-2 corresponding to the bandpass filters 103-1 and 103-2, respectively. The device 100B further includes the branch circuit 107 that is not provided in the first embodiment.

The EA modulator 101, the O/E converter 102, the amplifier 104, and the local oscillator 105 may be the same as in the first embodiment. Except for the bit rate, the bandpass filters 103-1 and 103-2 and the intensity detectors 106-1 and 106-2 may also be the same as in the first embodiment.

The branch circuit 107 is adapted to divide the signal output from the O/E converter 102 into two signals, which are in turn respectively provided to the bandpass filters 103-1 and 103-2.

The first embodiment is described with an attention directed to one type of beat component output from the EA modulator 101. The EA modulator 101, however, actually outputs a signal including a plurality of beat components including an integral multiple of the fundamental frequency.

When, for example, the optical signal 3 having the bit rate of N [bit/s] is input and the local oscillator 105 outputs the local oscillation signal having the frequency of N+Δf [Hz], the EA modulator 101 outputs the signal 101a, which has its beat components of Δf [Hz], 2Δf [Hz] and so on, i.e. beat signal. The beat signal 101a is photoelectrically converted by the O/E converter 102, and then divided by the branch circuit 107 into two signals 107a and 107b, which are provided to the bandpass filters 103-1 and 103-2, respectively.

With the instant alternative embodiment, the bandpass filter 103-1 is adapted to filter the frequency component of Δf [Hz], and the bandpass filter 103-2 is to filter the frequency component of 2Δf [Hz]. It then follows that the bandpass filter 103-1 allows the frequency of Δf [Hz] to pass, and the bandpass filter 103-2 allows a signal having the frequency of 2Δf [Hz] to pass as the primary component.

Therefore, the intensity detector 106-1 interconnected subsequently to the bandpass filter 103-1 provides the receiver 2 with the detection signal 106a, FIG. 1, depending on the intensity of the frequency component Δf [Hz], and the intensity detector 106-2 interconnected subsequently to the bandpass filter 103-2 provides the detection signal 106a depending on the intensity of the frequency component 2Δf [Hz].

Figure 6A:
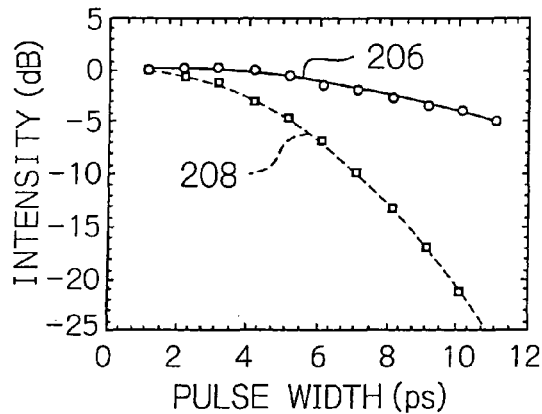
FIGS. 6A through 6D illustrate results of an intensity detection of different beat components in the third embodiment.
Figure 6B:
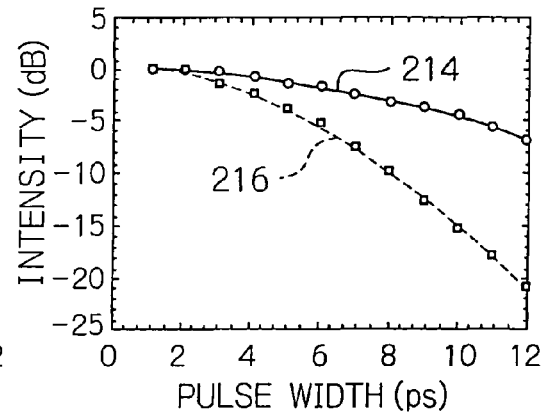
Figure 6C:
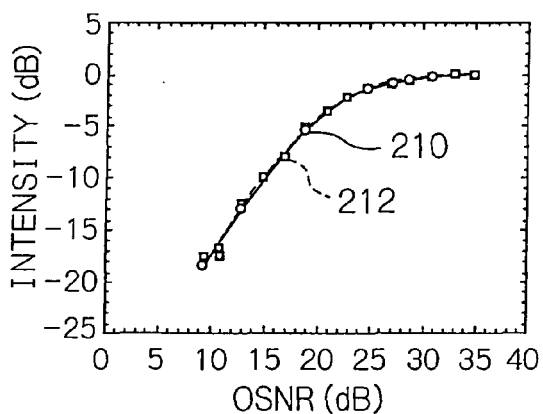

FIGS. 6A and 6C show results from a calculation or simulation of the detection signals 106a, and hence intensity signals, provided from the two intensity detectors 106-1 and 106-2, respectively, for the input optical signal 3 being a string of input short pulses at the rate of 40 [GHz] with the difference Δf of 250 [MHz].

FIG. 6A shows the detected intensity when the distribution property of the transmission line 3 varies to cause the pulse width to be expanded. The frequency difference Δf is assumed to be 250 [MHz]. The curve 206 corresponds to the 250 MHz component. The curve 208 corresponds to the 500 MHz component. FIG. 6C shows the detection intensity when the transmission line 3 has a larger loss, thus causing the OSNR to vary. The curves 210 and 212 correspond to the 250 and 500 MHz components, respectively. With reference to FIG. 6A, when the pulse width increases, the intensity signal of 500 [MHz] (2Δf) decreases rapidly, whereas the intensity signal of 250 [MHz] degrades by approximately a few dBs. As can be seen from FIG. 6C, however, when the OSNR varies with the pulse width constant, the two intensity signals vary in a similar manner to each other.

The two kinds of detection intensity may thus be monitored to determine whether the input optical signal 3 has been transmitted on the transmission line 3 with its pulse width spread or its loss increased. The function of the determination may not necessarily be allotted to the receiver 2, but may be performed by a determination circuit provided subsequently to the intensity detectors 106-1 and 106-2 and adapted to provide their outputs to the receiver 2, although not specifically be depicted in FIG. 5.

Figure 6D:
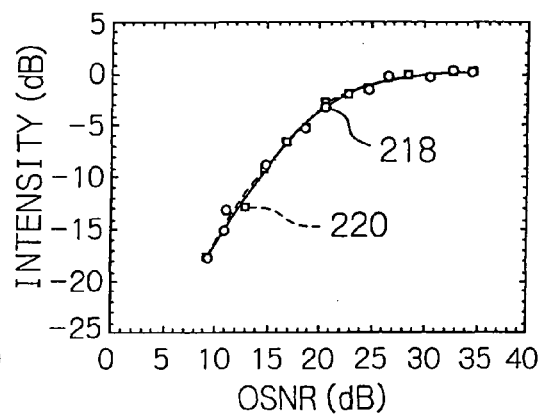

FIGS. 6B and 6D show results from a calculation or simulation of the detection signals 106a, i.e. intensity signals, provided from the two intensity detectors 106-1 and 106-2, respectively, for the input optical signal 3 being a string of input short pulses at the rate of 40 [GHz] with the local oscillation signal 105a having a frequency of N/4+Δf [GHz] (=10.25 [GHz]) generated by the local oscillator 105.

The two bandpass filters 103-1 and 103-2 have the center frequencies of 1 [GHz] and 2 [GHz], respectively. The curves 214 and 218 correspond to the 1 GHz component. The curves 216 and 220 correspond to the 2 GHz component. Again like the above, when the pulse width increases, the signal of 2 [GHz] differs in intensity from the signal of 1 [GHz], whereas, when the OSNR degrades, both of the signals do not significantly differ in signal intensity from each other.

Regardless of the frequency of the local oscillation signal 105a, therefore, the two sorts of detection intensity may be monitored to determine whether the input optical signal 3 has been transmitted over the transmission line 3 with its pulse width spread or its loss increased.

Thus, the instant alternative embodiment may have a similar advantage to the first embodiment and additionally have an advantage that it may monitor the two types of detection intensity to determine whether the input optical signal 3 has been transmitted over the transmission line 3 with its pulse width spread or its loss increased.

Figure 7:
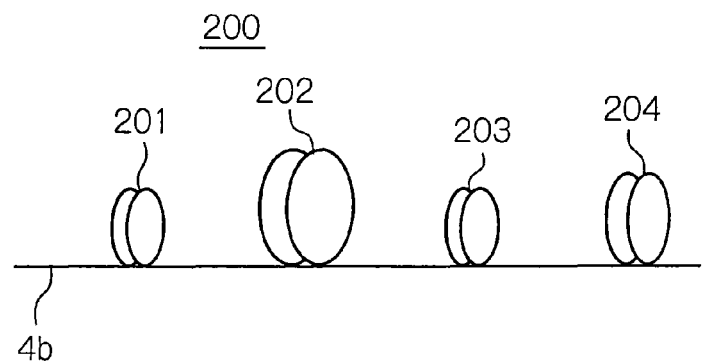
FIG. 7 illustrates the configuration of a fiber connection in a pulse width compression portion according to a fourth embodiment.

Now, the optical signal quality monitor device according to still another alternative, fourth embodiment of the present invention will be described below in detail. The fourth embodiment corresponds to the configuration of the third embodiment shown in FIG. 5 plus a pulse width compression portion 200, FIG. 7, which is disposed preceding to the EA modulator 101.

The pulse width compression portion 200 is provided for the following reason. The signal of 40 [Gbit/s] is often used with a pulse width of approximately 10 [ps] with its duty ratio of 40 [%]. As understood from FIG. 6A, the pulse width of approximately 10 [ps] causes the two signal intensities to differ by approximately 20 [dB] or more. Therefore, even when the transmission line 3 is in its good condition, the component of 2Δf [GHz] may not be caused. The pulse width compression portion 200 is thus provided in order to compress or reduce the pulse width of the input optical signal 3.

The pulse width compression portion 200 includes a high-nonlinearity optical fiber (HNLF) 201, a single-mode optical fiber (SMF) 202, a high-nonlinearity optical fiber (HNLF) 203, and a single-mode optical fiber (SMF) 204 of 100 [m], 500 [m], 100 [m], and 200 [m] long, respectively, all of which are interconnected in serial to each other. The high-nonlinearity fiber (HNLF) and the single-mode fiber (SMF) thus employed have the characteristics shown in FIG. 8.

Figures 8, 9:
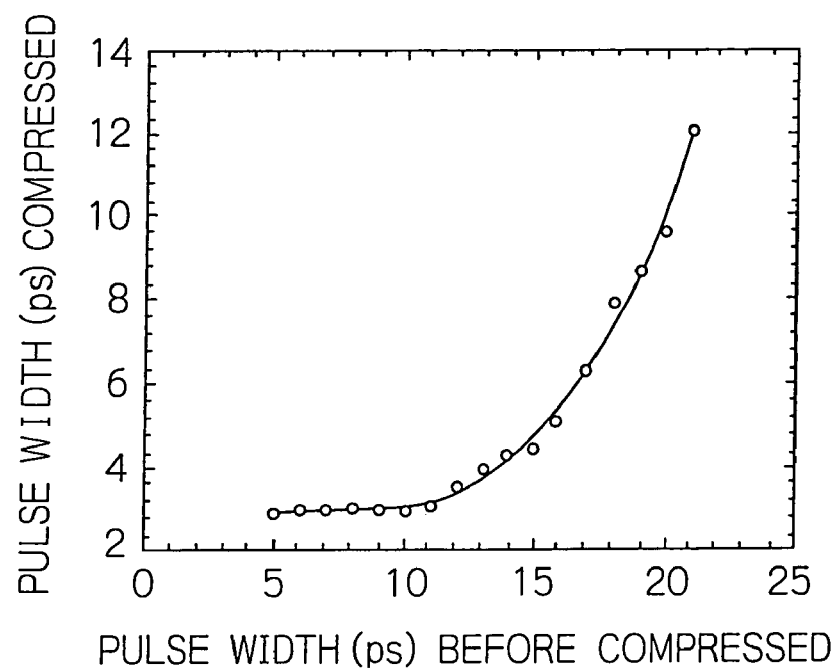
FIG. 8 exemplarily shows the characteristics of an optical fiber applied to the pulse width compression portion according to the fourth embodiment.
FIG. 9 plots the compression characteristics of a pulse width in the pulse width compression portion according to the fourth embodiment.

FIG. 9 plots the pulse width before and after compressed or reduced. The x-axis represents the pulse width before compressed. The y-axis represents the pulse width after compressed. When the pulse width before compressed is approximately 10 [ps] or less, the output is approximately 3 [ps] at most. When distribution variation causes the pulse width before compressed to be increased to approximately 15 [ps], however, the output becomes approximately 4.5 [ps]. Because the pulse width of approximately 15 [ps] before compressed may not allow its intensity to be detected, even an application of the curves shown in FIG. 6A would not allow the pulse widths of 10 [ps] and 15 [ps] before compressed to be distinguished from each other. However, an application of the curves shown in FIG. 6A allows the pulse widths of 3 [ps] and 4.5 [ps] after compressed to be distinguished from each other, providing a difference of 2 dB between both of the signal intensities.

The present alternative, fourth embodiment may have a similar advantage to the third embodiment and also have an advantage that it may be adaptive to a signal having a higher duty ratio.

Although the above-described embodiments are exemplarily directed to the bit rate (N) of 159.25248 approximately equivalent to 160 [Gbit/s] or 39.81312 approximately equivalent to 40 [Gbit/s], it will be appreciated that the present invention is not restricted to the specific values of bit rate.

Although the illustrative embodiments have been described with respect to the EA modulator 101 adapted for mixing the input optical signal with the local oscillation signal 104a, other types of modulator may be used to mix the input optical signal 4b with the local oscillation signal 104a.

Although the second embodiment includes the bandpass filters 103-1, 103-2 and 103-3 provided in the same number as the types of bit rates, they may be replaced with one variable bandpass filter adapted to alternatively switch its pass band depending on the bit rate of the input optical signal 3.

Although the above illustrative embodiments are adapted to perform the photoelectric conversion performed on the output stage 101a of the EA modulator 101, the photoelectric conversion may be performed at different positions. The mixer 101 may be, for example, an electric mixer which is adapted to receive the input signal 4b in the form of electrical signal after converted. The bandpass filter may be, for example, an optical bandpass filter, or wavelength-pass filter, subsequent to which the photoelectric conversion may then be performed. It is therefore intended that the appended claims encompass such modified embodiments and aspects.

The entire disclosure of Japanese patent application No. 2006-265247 filed on Sep. 28, 2006, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What I claim is:

1. An optical signal quality monitor device, comprising:
   a local oscillator that generates a local oscillation signal;
   a mixer that mixes an input optical signal with the local oscillation signal, said mixer comprising an electro-absorption modulator;
   a first filter interconnected to said mixer for extracting at least one beat component of a signal output from said mixer;
   a first intensity detector interconnected to said first filter for detecting intensity of the extracted beat component,
   wherein the input optical signal is of one bit rate, and said first filter and said first intensity detector are provided for the one bit rate of the input optical signal;
   a second filter interconnected to said mixer for extracting another beat component of the signal output from said mixer, the other beat component being different from the one beat component;
   a second intensity detector interconnected to said second filter for detecting intensity of the extracted other beat component,
   wherein the input optical signal is of a short pulse, whereby it is determined from output signals from said first and second intensity detectors whether the input optical signal has been transmitted over a transmission line with a spread in its pulse width or with an increased loss thereof; and
   a pulse width compression circuit interconnected to an input of said mixer for compressing the pulse width of the pulse of the input optical signal to deliver the input optical signal with the pulse width thus compressed.

2. The monitor device in accordance with claim 1, further comprising an optical-to-electrical converter for converting the output signal of said mixer to a corresponding electric signal to deliver the electric signal to said first filter.

3. The monitor device in accordance with claim 1, further comprising:
   an optical-to-electrical converter for converting the output signal of said mixer to a corresponding electric signal; and
   a branching circuit interconnected to said optical-to-electrical converter for delivering the electric signal to said first filter and said second filter.

* * * * *